United States Patent [19]

Tanaka

[11] Patent Number: 5,644,672
[45] Date of Patent: Jul. 1, 1997

[54] OPTICAL FIBER HOLDER USED IN OPTICAL CONNECTORS

[75] Inventor: Toshiyasu Tanaka, Yokohama, Japan

[73] Assignee: Asahi Kohoen, Co., Ltd., Yokohama, Japan

[21] Appl. No.: 566,573

[22] Filed: Nov. 28, 1995

[30] Foreign Application Priority Data

Dec. 5, 1994 [JP] Japan .................................. 6-329979

[51] Int. Cl.⁶ .................................................. G02B 6/36
[52] U.S. Cl. ............................ 385/137; 385/62; 385/72; 385/78; 385/81
[58] Field of Search ............................ 385/137, 62, 81, 385/77, 72, 78, 83, 84

[56] References Cited

U.S. PATENT DOCUMENTS

| | | | |
|---|---|---|---|
| 4,101,198 | 7/1978 | Heldt | 385/81 |
| 4,705,352 | 11/1987 | Margolin et al. | 385/81 |
| 4,781,430 | 11/1988 | Tanaka | 350/96.2 |
| 4,910,857 | 3/1990 | Tanaka | 350/96.2 |
| 4,968,109 | 11/1990 | Tanaka | 350/96.2 |
| 5,185,837 | 2/1993 | Ayuta et al. | 385/81 |
| 5,390,270 | 2/1995 | Hazawa et al. | 385/137 X |

FOREIGN PATENT DOCUMENTS

| | | |
|---|---|---|
| 0159198 | 10/1985 | European Pat. Off. . |
| 0505149 | 11/1993 | European Pat. Off. . |
| 8622121 | 11/1986 | Germany . |
| 3922301 | 3/1990 | Germany . |
| 63-18306 | 1/1988 | Japan . |
| 5-48446 | 7/1993 | Japan . |

*Primary Examiner*—Phan T. H. Palmer
*Attorney, Agent, or Firm*—Beveridge, DeGrandi, Weilacher & Young LLP

[57] ABSTRACT

An optical fiber holder comprising a pair of hollow metal members opposingly provided so as to interpose an optical fiber between them, and a holding case that holds the hollow metal members in such a state that their peripheries are pressed against its inner wall. The hollow metal members are in the shape of half-round cylinders on the whole, and are provided in such a manner that the planar portions thereof face each other so that the optical fiber is held between the hollow members at the center of each planar portion thereof. The optical fiber can be elastically fixed without causing a damage to the optical fiber main body and can be firmly fixed because of the great contact areas assured in the axial direction and in the peripheral direction.

7 Claims, 8 Drawing Sheets

OPTICAL FIBER HOLDER USED IN OPTICAL CONNECTORS

BACKGROUND OF THE INVENTION

1. Field of the Invention

This invention relates to an optical fiber holder used in optical connectors or the like which join the individual optical fibers.

2. Description of the Related Art

To join the individual optical fibers, a method has been hitherto employed in which an end of an optical fiber is brought into hold with a holder called a ferrule and the holder having the optical fiber is fitted to a connector or the like so that ends of optical fibers to be joined are precisely butted to each other and fixed. In such an instance, the optical fiber is required to be securely held so as not to be damaged and also not to come off, because even a little fault produced when the optical fiber is brought into hold with the holder may cause a break.

As methods for bringing ends of optical fibers into hold with holders, it has been proposed to use (1) a method in which the optical fiber is inserted into a cylindrical sleeve and fixed with an adhesive, (2) a method as disclosed in Japanese Patent Publication No. 5-48446 in which the optical fiber is inserted to a metal pipe or the like and is secured by mechanically clamping the metal pipe, (3) notches are made in a metal pipe at its one end in the axial direction to a certain extent, and the notched end is branched off (or made divergent or fishtail) to form an elastic tail portion, where the optical fiber is inserted to the metal pipe thus worked and thereafter the elastic tail portion is pressed to elastically clamp and fix the optical fiber, and (4) a method as disclosed in Japanese Patent Application Laid-open No. 63-18306, in which a plurality of metal tube members having circular cross sections are longitudinally provided around the optical fiber, and the optical fiber is fixed by holding these tube members in a compressed state by means of a holding member provided around the tube members.

However, in the case where the optical fiber is fixed with an adhesive as in the above (1), it takes time to pretreat the optical fiber and dry the adhesive, bringing about not only a poor productivity but also a possibility that the position of the optical fiber may turn aside before the adhesive solidifies.

In the method where the metal pipe is directly clamped as in the above (2), the optical fiber may be damaged, e.g., broken, if it is clamped with even a little to strong of a force, and on the other hand the optical fiber may come off if it is clamped with to weak of a force, causing the problem that the force of clamping must be strictly controlled.

In the method where the elastic tail portion formed in the metal pipe is utilized as in the above (3), the area at which the optical fiber is elastically held is very small to cause the problem that the materials for the holding portion and the precision of working must be strictly controlled.

In the method where the tube members having circular cross sections are used as in the above (4), the tube members are only in linear contact with the optical fiber, and hence no sufficient force of fixing can be obtained, causing the optical fiber to come off in some cases.

SUMMARY OF THE INVENTION

Accordingly, an object of the present invention is to provide an inexpensive optical fiber holder that may cause no damage to optical fibers, can surely fix them and also can be assembled with ease.

To achieve the above object, the optical fiber holder of the present invention comprises a pair of hollow members opposingly provided so as to interpose an optical fiber between them, and a holding case that holds the hollow members in such a state that their peripheries are pressed against its inner wall; the hollow members being in the shape of half-round cylinders on the whole, and being provided in such a manner that the planar portions thereof face each other so that the optical fiber is held between the hollow members at the center (widthwise) of each planar portion thereof.

In a preferred embodiment of the present invention, the hollow members are in the shape of half-round cylinders on the whole and also a holding groove to which the optical fiber is to be fitted in the axial direction is formed at the center of each planar portion of the hollow members.

In a more preferred embodiment of the present invention, one-end side of the holding groove is made to have a larger inner groove diameter to form a fiber lead-in portion and the other-end side of the holding groove is made to have a smaller inner groove diameter to form a fiber fixing portion.

In a still more preferred embodiment of the present invention, the hollow members are each provided with a terrace at the middle of each planar portion thereof, and the planar portion around the optical fiber fixing portion of the holding groove has a plane receded toward the peripheral side of the hollow member with respect to the planar portion around the optical fiber lead-in portion of the holding groove.

In another preferred embodiment of the present invention, the holding case comprises;

an optical fiber guide formed of a cylindrical member having at the center thereof an insertion hole through which the optical fiber is fittingly inserted and having such a shape that the rear-end side thereof becomes smaller in diameter than the front-end side thereof; and a sleeve one-end side of which has such an inner diameter that the pair of hollow members can be inserted and the rear-end side of the optical fiber guide is press-inserted, and the other-end side of which has such an inner diameter that the peripheries of the pair of hollow members can be pressed against its inner wall when the hollow members are crammed thereinto with the rear end portion of the optical fiber guide.

DESCRIPTION OF THE PREFERRED EMBODIMENTS

The optical fiber holder of present invention is basically constituted of a pair of hollow members opposingly provided so as to interpose an optical fiber between them, and a holding case that holds the hollow members in such a state that their peripheries are pressed against its inner wall. The hollow members are in the shape of half-round cylinders on the whole, and are provided in such a manner that the planar portions thereof face each other so that the optical fiber is held between the hollow members at the center (widthwise) of each planar portion thereof.

According to the optical fiber holder of the present invention, a pair of half-round cylindrical hollow members are face-to-face put together with their planar portions inside, and an optical fiber is inserted to the center of the planar portions of the hollow members so that the peripheries of the hollow members are pressed against the inner wall of the holding case, whereby the hollow members undergo compression deformation to tighten and fix the optical fiber. Since in this way the optical fiber is elastically tightened and fixed by tightening it via such a pair of hollow members, the optical fiber can be hardly damaged or broken and the force of pressing may be not so strictly controlled, bringing about an improvement in productivity.

In the conventional method in which the metal pipe is clamped or the elastic tail portion formed in the metal pipe is utilized to press-hold the optical fiber, the contact area between the optical fiber and the metal pipe at the portion where the latter presses the former is so small that the pressure converges to tend to damage the optical fiber, and yet, an optical fiber pressed at a weak force tends to cause a trouble of coming off. However, in the holder of the present invention, since the optical fiber comes into contact with the hollow members over a large area in the axial direction and in the peripheral direction, the pressure is diverged to hardly cause a damage to the optical fiber and also a force of fixing can be strong enough to prevent the optical fiber from coming off.

In the method disclosed in Japanese Patent Application Laid-open No. 63-18306, the optical fiber only comes into linear contact with the tube members, and hence no sufficient force of fixing can be obtained. In the present invention, however, the optical fiber is pressed between the planar portions of the half-round cylindrical hollow members, whereupon the above planar portions curve to come into face contact with the periphery of the optical fiber, so that a stronger force of fixing can be obtained. Also, a holding groove to which the optical fiber is to be fitted in the axial direction may be formed at the center of each planar portion of the hollow members. This can make much larger the contact area between the hollow members and the optical fiber, so that the above effect can be made higher.

Meanwhile, in a preferred embodiment of the present invention, one-end side of the holding groove of the hollow member is made to have a larger inner groove diameter to form a fiber lead-in portion and the other-end side of the holding groove is made to have a smaller inner groove diameter to form a fiber fixing portion. In such an instance, the optical fiber can be inserted to the gap between the hollow members with ease by inserting the optical fiber thereto on the side of the fiber lead-in portion. The groove inner diameter of the holding groove at its fixing portion may be made small enough for the jacket of the optical fiber not to enter, whereby the jacket portion can be prevented from enter into the fixing portion. Moreover, since the groove inner diameter of the holding groove is made larger at the end on the side of the lead-in portion, the hollows of the hollow members have a crushed shape, so that the optical fiber can be prevented from being inserted into the hollows.

The present invention will be described below in detail with reference to the accompanying drawings.

Figure 12:
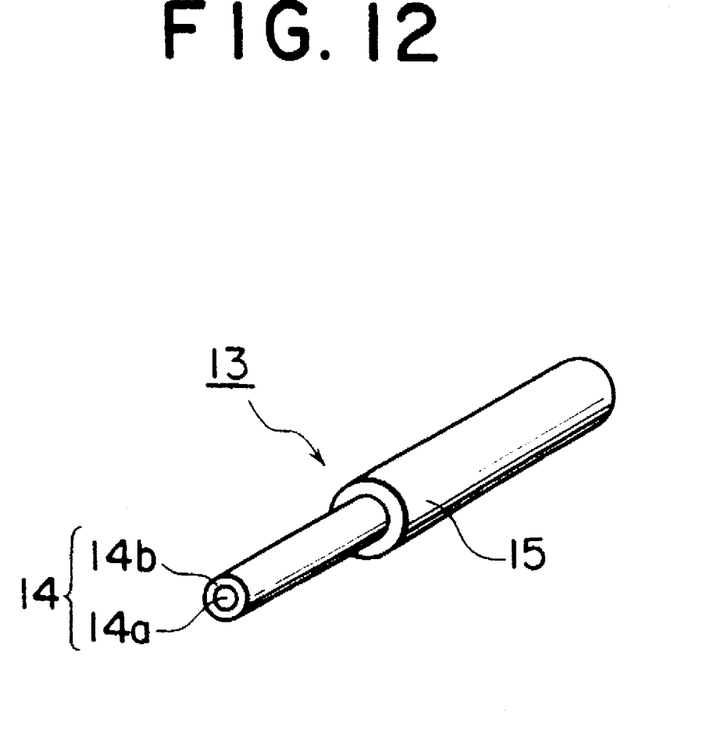
FIG. 12 is a perspective view to illustrate a shape commonly taken for optical fibers.

FIG. 12 illustrates a shape commonly taken for optical fibers to which the optical fiber holder of the present invention is applied. More specifically, an optical fiber 13 is constituted of a fiber main body 14 comprised of a core 14a and a clad 14b and a jacket 15 made of resin, covering the main body. When the optical fiber 13 is brought into a pressure hold with a holder, the jacket 15 must be stripped at one end of the optical fiber 13 in a certain length so that the fiber main body 14 itself can be held.

Figure 3:
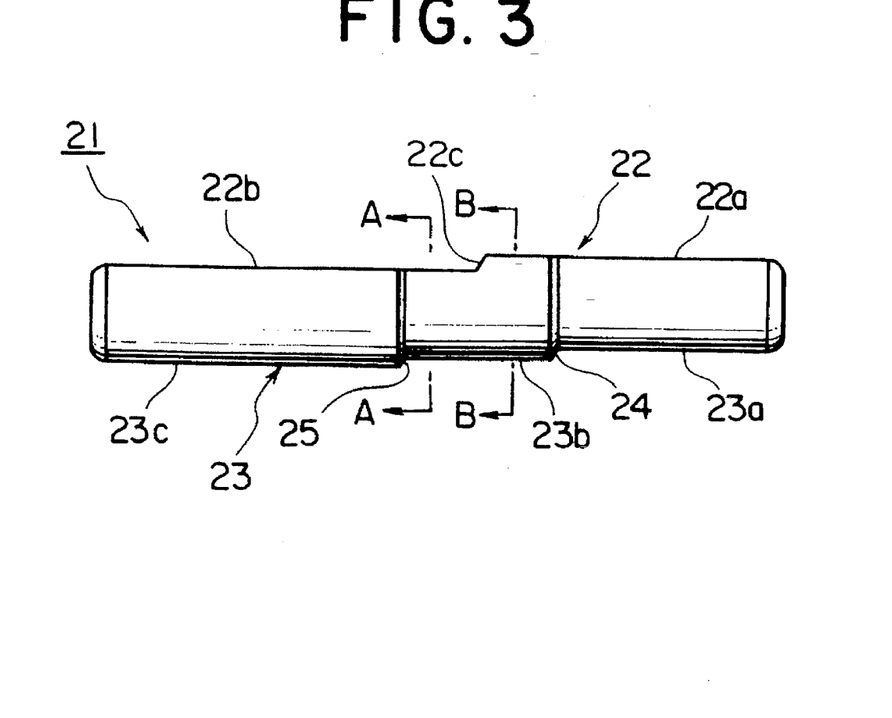
FIG. 3 is a front elevation to illustrate an example of the hollow member used in the optical fiber holder of the present invention.

FIGS. 3 to 8 illustrate an example of the hollow member used in the optical fiber holder of the present invention. FIG. 3 is a front elevation, FIG. 4 a plan view, FIG. 5 a right-side elevation, FIG. 6 a left-side elevation, FIG. 7 a cross section along the line A—A in FIG. 3, and FIG. 8 a cross section along the line B—B in FIG. 3.

This hollow member 21 is preferably made of a material capable of plastic deformation, such as metal. In the present embodiment, it is obtained by press-molding a cylindrical member made of brass, and has the shape of a substantially half-round cylinder. The planar portion 22 has an inward raised portion 22a and an outward receded portion 22b which border on a terrace 22c formed between them. Its periphery 23 has an inward receded portion 23a, an intermediate portion 23b and an outward raised portion 23c which border on two terraces 24 and 25. The inward raised portion 22a of the planar portion 22 and the inward receded portion 23a of the periphery 23 are substantially positioned inside-to-outside correspondingly. The outward receded portion 22b of the planar portion and the outward raised portion 23c of the periphery 23 are substantially positioned inside-to-outside correspondingly.

Figure 4:
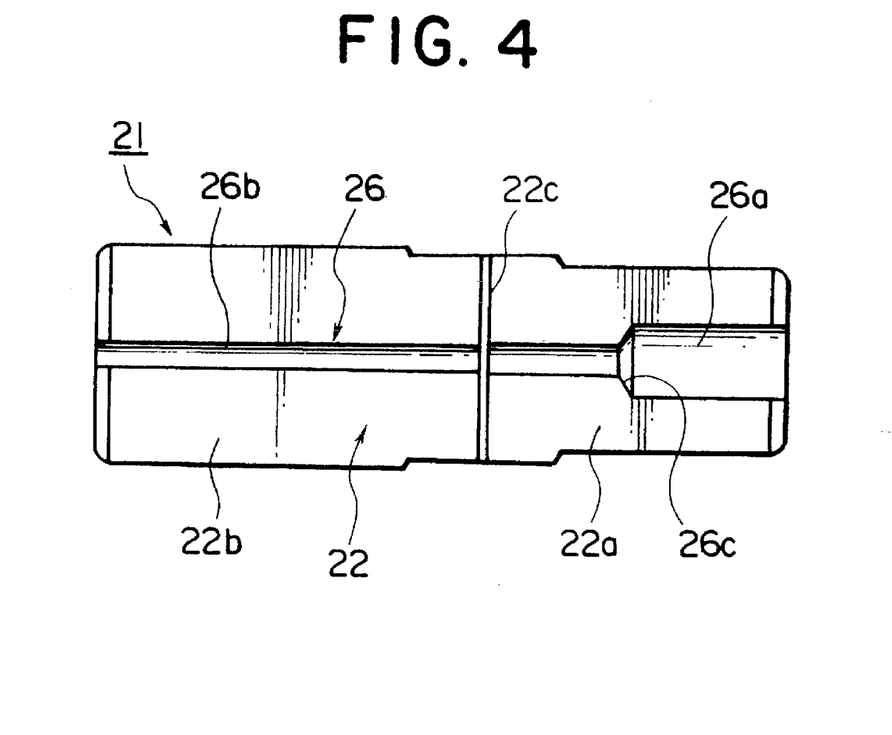
FIG. 4 is a plan view of the hollow member shown in FIG. 3.

At the center (widthwise) of the planar portion 22, an optical fiber holding groove 26 is formed in the axial direction. One-end of the holding groove 26 is made to have a larger groove inner diameter to form an optical fiber lead-in portion 26a. The other-end of the holding groove 26 is made to have a smaller inner groove diameter to form an optical fiber fixing portion 26b. The boundary between the lead-in portion 26a and the fixing portion 26b forms a tapered area 26c where the inner diameter becomes gradually smaller.

The inner diameter of the holding groove 25 is so designed that, when the pair of hollow members 21 are face-to-face put together with their planar portions 22 inside, the inner diameter of the lead-in portion 26a defined by holding grooves 26 has such a size that the optical fiber can be inserted at its part covered with the jacket and the inner diameter of the fixing portion 26b defined by holding grooves 26 has such a size that the fiber main body of the optical fiber substantially fits.

Figure 5:
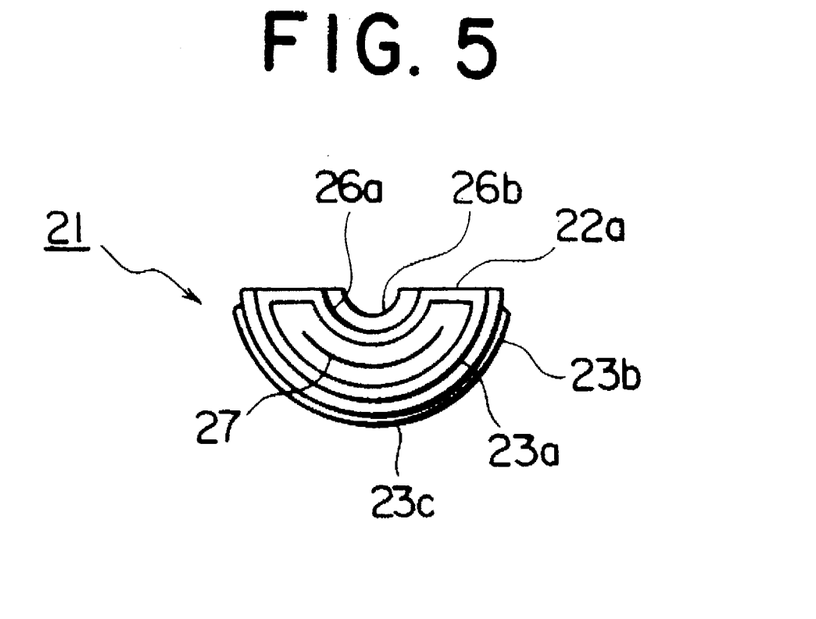
FIG. 5 is a right-side elevation of the hollow member shown in FIG. 3.

As shown in FIG. 5, on the one-end side of the hollow member 21 at which the lead-in portion 26a is formed, a hollow 27 has the shape of an arc in an almost crushed state because of the lead-in portion 26a having a broad and deep groove. Hence, when the optical fiber is inserted, it can be prevented from wrongly being inserted into the hollow 27.

Figure 6:
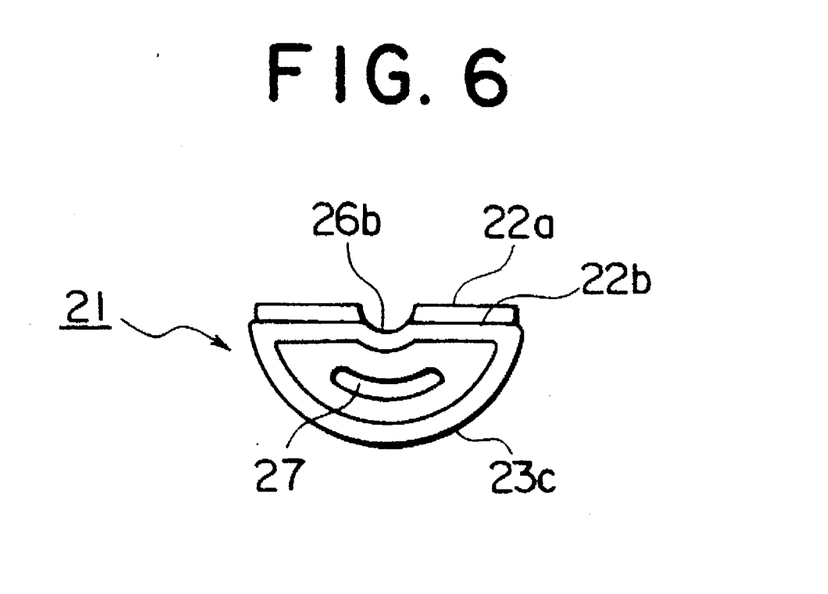
FIG. 6 is a left-side elevation of the hollow member shown in FIG. 3.
Figure 7:
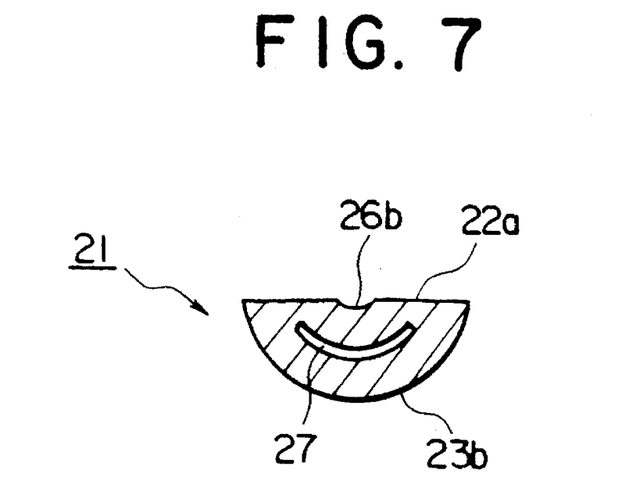
FIG. 7 is a cross section of the hollow member along the line A—A in FIG. 3.
Figure 8:
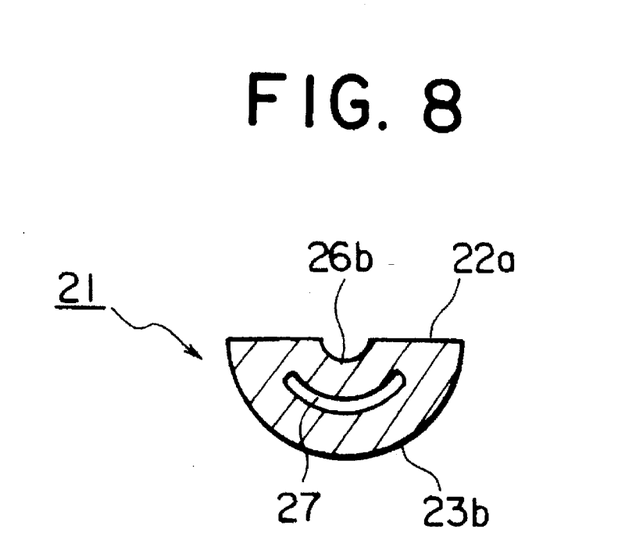
FIG. 8 is a cross section of the hollow member along the line B—B in FIG. 3.

As shown in FIG. 6, on the other-end of the hollow member 21 at which the fixing portion 26b is formed, the hollow 27 is not crushed and has a sufficient gap because of the fixing portion 26b formed to have a narrow and shallow groove. Hence, when the optical fiber is pressed against the fixing portion 26b, a resilience is imparted so that the groove inner diameter is not damaged.

Figure 1:
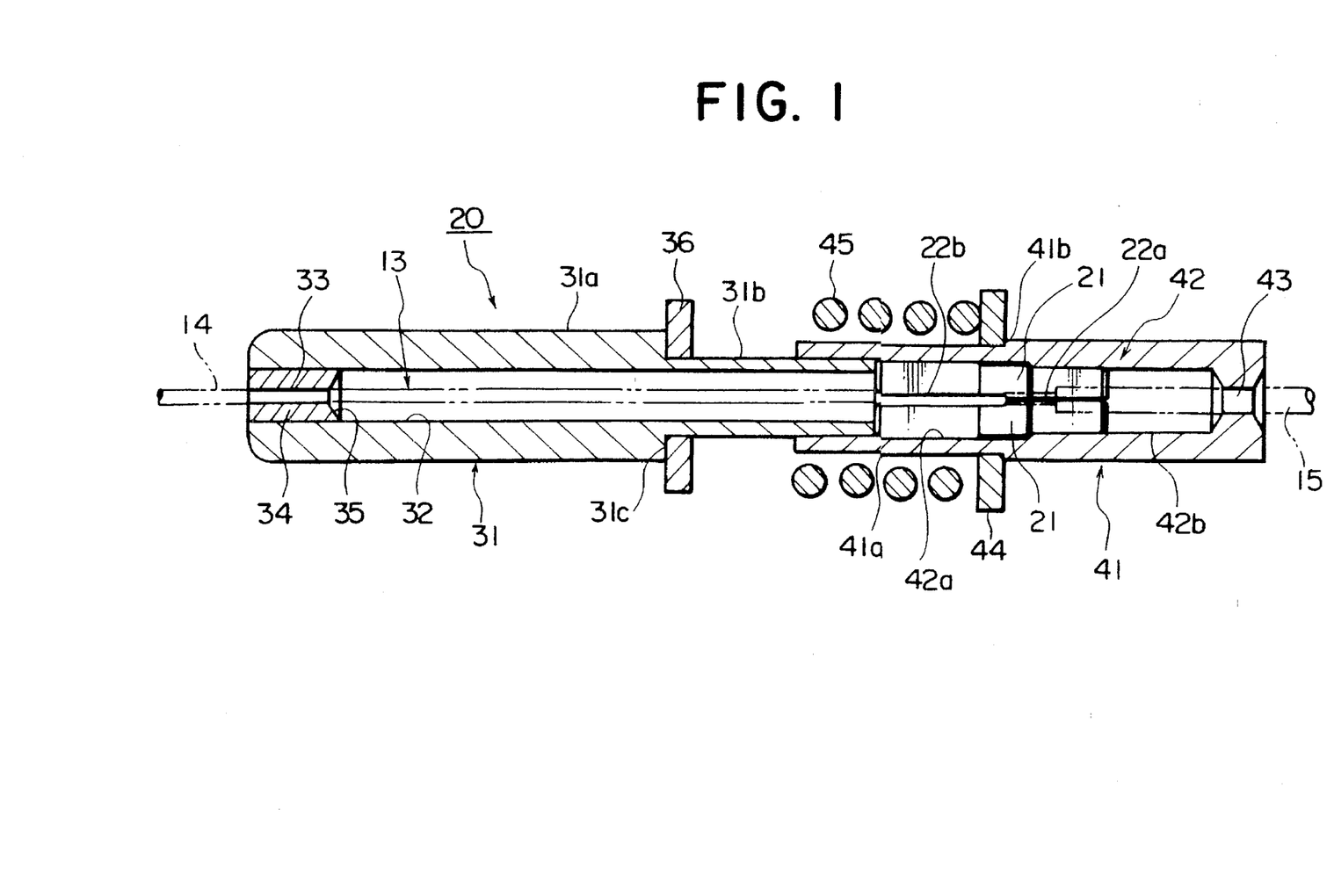
FIG. 1 is a cross section to illustrate an embodiment of the optical fiber holder according to the present invention, standing before the optical fiber is tightened.
Figure 2:
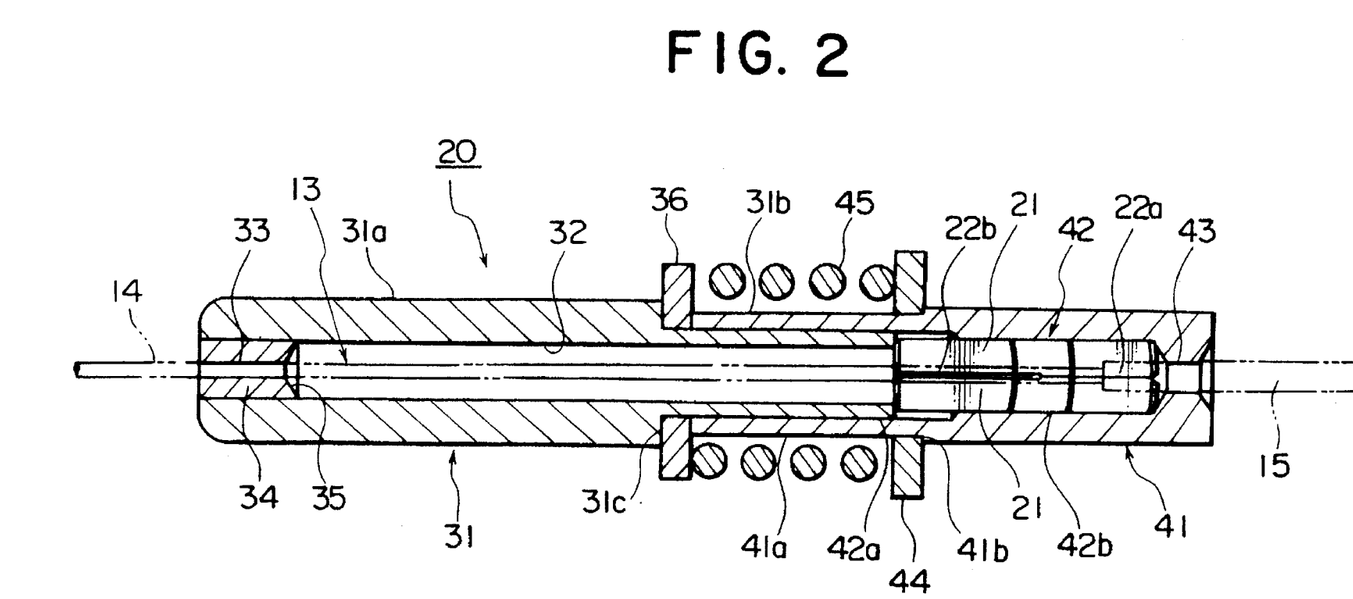
FIG. 2 is a cross section to illustrate the FIG. 1 optical fiber holder in which the optical fiber has been tightened.

FIGS. 1 and 2 illustrate an embodiment of the optical fiber holder of the present invention in which the hollow members 21 described above are fitted to a holding case. FIG. 1 illustrates the optical fiber holder standing before the optical fiber is tightened. FIG. 2 illustrates the optical fiber holder in which the optical fiber has been tightened.

The optical fiber holder, denoted by reference numeral 20, is constituted of an optical fiber guide 31 made of stainless steel or a ceramic such as zirconia, a sleeve 41 made of stainless steel or the like, a pair of hollow members 21 held inside the sleeve 41, and the optical fiber 13 held between these hollow members 21. The optical fiber guide 31 and the sleeve 41 constitute the holding case in the present invention.

The optical fiber guide 31 has the shape of a cylinder on the whole, and is comprised of a front-end 31a having a large outer diameter and a rear-end 31b having a small outer diameter. An axial hole 32 of the optical fiber guide 31 has such a size that the optical fiber (main body) 14 can be inserted in a free state except its forward end. At the forward end of the axial hole 32, a guide sleeve 34 made of resin is fitted, having a guide hole 33 with an inner diameter which is enough for the optical fiber (main body) 14 to fit. The guide hole 33 is made gradually larger in diameter to form a tapered area 35 at the rear end face of the guide sleeve 34. This facilitates easy insertion of the optical fiber main body 14.

On the periphery of the rear-end 31b of the optical fiber guide 31, a ring member 36 is fitted at its front end. The ring member 36 engages with a terraced portion 31c formed between the front-end side 31a and the rear-end side 31b so that it does not move toward the front-end side 31a.

The sleeve 41 has a holding hole 42 to which the hollow members 21 are inserted. This holding hole 42 communicates with a lead-in hole 43 through which the optical fiber 13 is led in, to form a through-opening that passes through the axis of the sleeve 41. The holding hole 42, at its front-end, allows insertion of the pair of hollow members 21 and also has an enlarged diameter portion 42a having an inner diameter large enough for the rear-end 31b of the optical fiber guide 31 to be pressed thereinto, and, at its read-end, has a reduced diameter portion 42b having an inner diameter small enough for the pair of hollow members 21 to press against the inner wall of the sleeve.

The periphery of the sleeve 41 has a reduced diameter portion 41a at its front-end, and a ring member 44 is fitted on the periphery thereof at its rear end. This ring member 44 engages with a terraced portion 41b so that it does not move rearward. This ring member 44 serves as a portion where the present optical fiber holder is fixed to an optical connector (not shown). Then, a coil spring 45 is fitted between the ring member 36 fitted on the periphery of the rear end portion of the optical fiber guide 31 and the ring member 44 fitted on the periphery of the sleeve 41.

The ring members 36 and 44 and the coil spring 45 are provided so that the tip of the optical fiber guide 31 may elastically come into contact with a member to be connected, when the former is brought into contact with the latter. These, however, are not necessarily essential in the present invention.

How to use this optical fiber holder 20 will be described below.

First, as shown in FIG. 1, the pair of hollow members 21 as shown in FIGS. 3 to 8 are inserted, with their lead-in portion 26a side ahead, to the enlarged diameter portion 42a of the holding hole 42 of the sleeve 41 in the state that their planar portions 22 stand face-to-face. The ring member 44 and the coil spring 45 are beforehand fitted on the periphery of the reduced diameter portion 41a of the sleeve 41. In this state, the rear-end side 31b fitted with the ring member 36 of the optical fiber guide 31 is inserted to the enlarged diameter portion 42a of the holding hole 42 of the sleeve 41.

Then, the leading end to be connected, of the optical fiber 13 is passed through the lead-in hole 43 of the sleeve 41, further passed through between the pair of hollow members 21, and still further passed through the axial hole 32 and the guide hole 33 until it projects from the front end face of the optical fiber guide 31. Here, the leading end portion of the optical fiber 13 is beforehand stripped of its jacket 15 in a predetermined length so that the fiber main body 14 is kept bare. Since the optical fiber 13 is inserted from the lead-in portion 26a of the holding grooves 26 of the hollow members 21, it can be inserted with ease. Also, the part where it is covered with the jacket 15 can be inserted to the lead-in portion 26a but can not be inserted to the fixing portion 26b. The optical fiber main body 14 is held in such a state that it fits to the holding grooves 26 of the hollow members 21.

After the optical fiber 13 has been set in this way, the rear-end side 31b of the optical fiber guide 31 is, as shown in FIG. 2, firmly crammed into the innermost recess of the enlarged diameter portion 42a of the holding hole 42 of the sleeve 41. As the result, the pair of hollow members 21 are crammed into the reduced diameter portion 42b of the holding hole 42 with the side of the lead-in portion 26a ahead as shown in FIG. 2. Here, since the terraces 24 and 25 are provided on the periphery of the hollow members 21 and the outer diameter on the side of the lead-in portion 26a is made smaller, the hollow members 21 can be crammed into the reduced diameter portion 42b of the holding hole 42 with ease.

Moreover, since the planar portions 22b of the pair of hollow members 21 around the fixing portion 26b have such a shape that they are outward receded and also the peripheries 23c at that portion have such a shape that they are outward raised, the peripheries 23c at the part where the fixing portion 26b of the hollow members 21 is provided can be effectively pressed against the wall at the reduced diameter portion 42b of the holding hole 42. As the result, the optical fiber main body 14 is fixed under pressure in the state that it is held between the pair of hollow members 21 at their fixing portion 26b. Since also the pressure exerted by the hollow members 21 is elastically applied on account of the hollows 27, the optical fiber main body 14 can be prevented from being damaged. Incidentally, after the optical fiber 13 has been fixed, the part of the optical fiber main body 14, projecting from the forward end of the optical fiber guide 31 is cut off by a conventional method and is optionally polished.

In this way, in the present optical fiber holder 20, the optical fiber 13 is elastically tightened and fixed by means of the pair of hollow members 21 having the hollows 27, and hence the optical fiber itself may hardly be damaged and also the contact areas can be assured in a great extent in the axial direction and in the peripheral direction, so that the optical fiber 13 can be firmly fixed.

Figure 9:
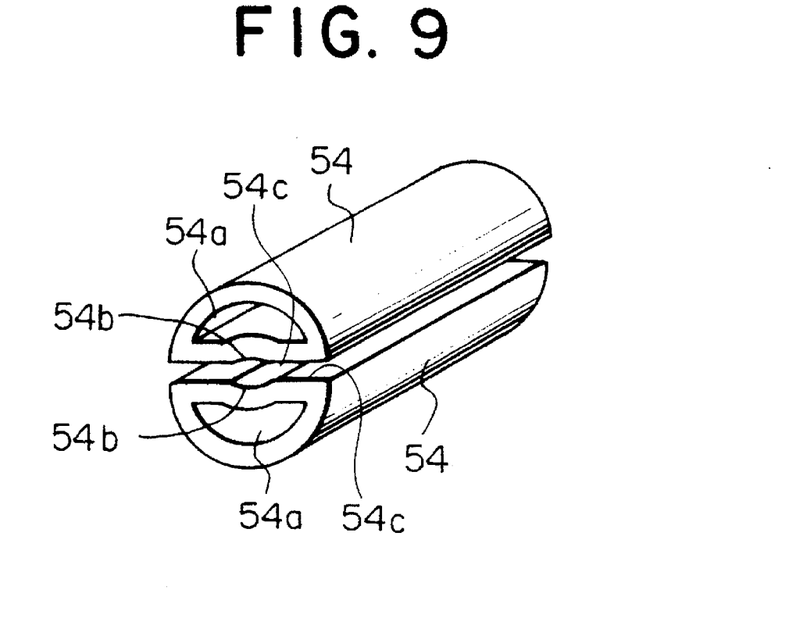
FIG. 9 is a perspective view to illustrate another example of hollow members used in the optical fiber holder of the present invention.
Figure 10:
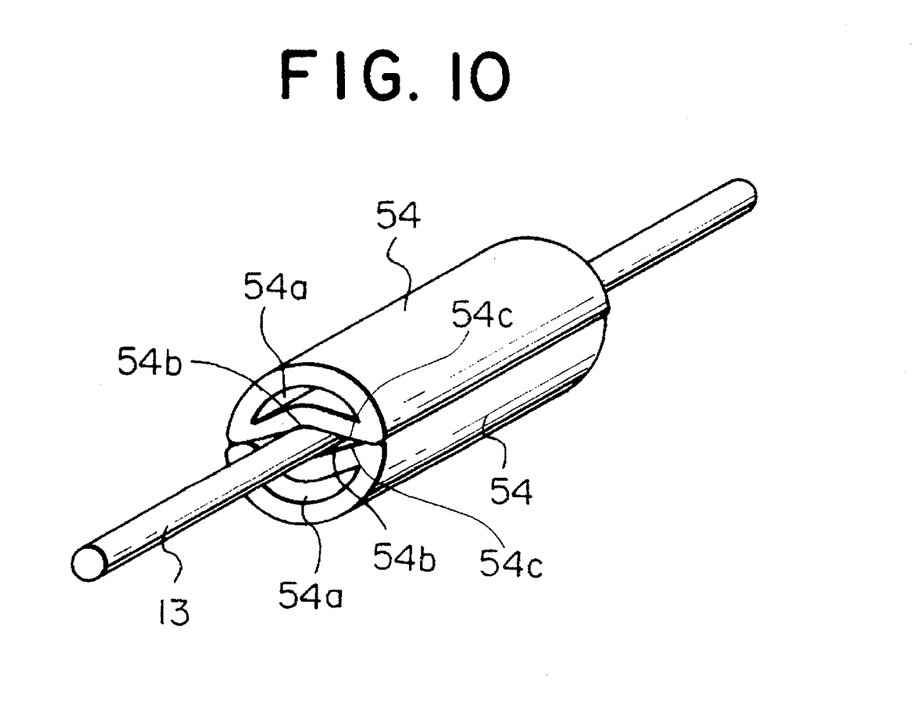
FIG. 10 is a perspective view to illustrate how the optical fiber is held between the hollow members shown in FIG. 9.

FIG. 9 illustrates another example of the hollow members used in the optical fiber holder of the present invention. FIG. 10 also illustrates how the optical fiber is held between the hollow members shown in FIG. 9.

As shown in FIG. 9, a pair of hollow members 54 are formed by crushing hollow metal pipes so as to provide half-round cross sections, where substantially half-round hollows 54a are formed in the interior and holding grooves 54b extending in the axial direction are respectively formed at the centers (widthwise) of planar portions 54c. Then, the pair of hollow members 54 are so provided that their planar portions 54c face to each other, and are held in the same holding case as the one shown in FIGS. 1 and 2.

As shown in FIG. 10, the optical fiber 13 is brought into hold with the hollow members 54 between their planar portions 54c so that the optical fiber 13 is made to fit to the holding grooves 54b. Then the same operation as in the above embodiment may be repeated so as to press the hollow members 54 against the wall inside the holding case, whereby the optical fiber 13 can be pressure-fixed.

Figure 11A:
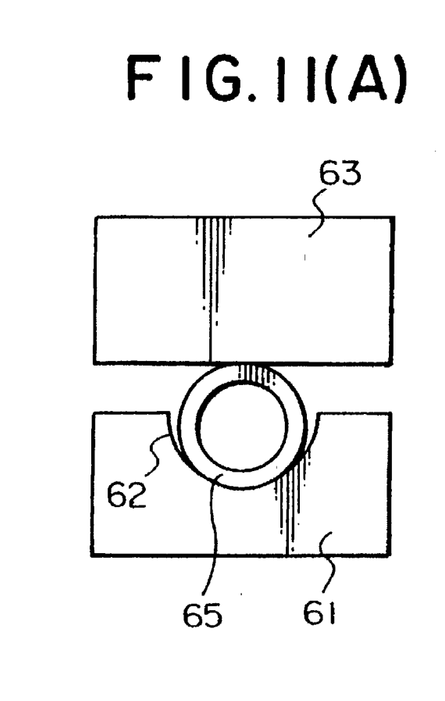
FIGS. 11(A) to 11(C) show a flow sheet of an example of a process for producing a hollow member used in the optical fiber holder of the present invention.
Figure 11B:
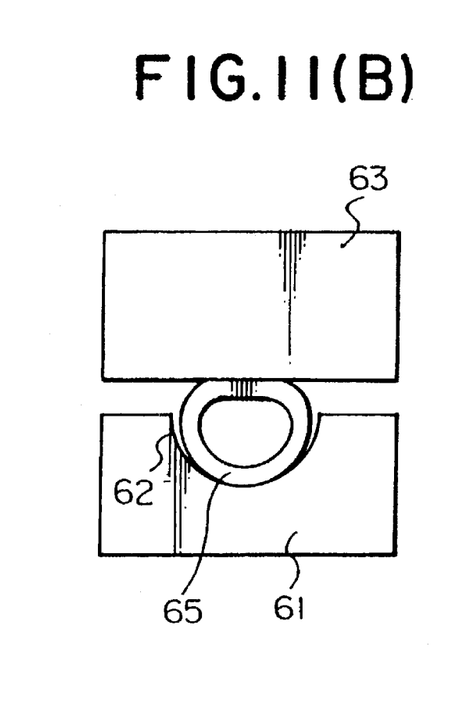
Figure 11C:
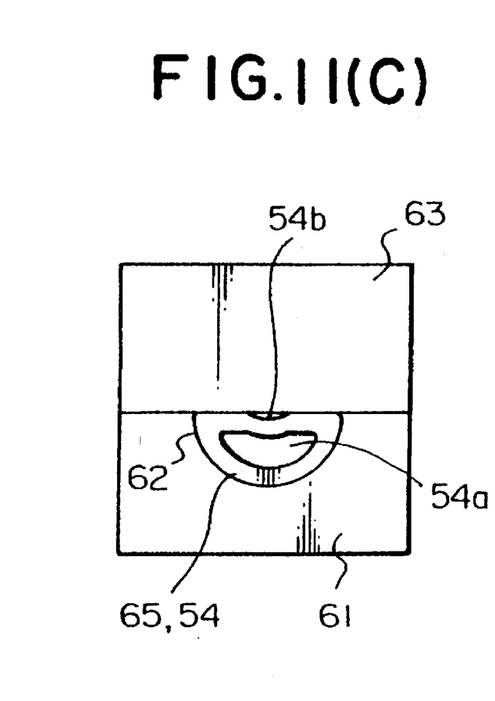

FIGS. 11(A) to 11(C) illustrate an example of a process for producing the hollow member 54.

In these drawings, reference numeral 61 denotes a die, at the middle of which a groove 62 is formed in the shape of a half-round cross section. A punch 63 is also provided opposingly to the die 61. The bottom surface 64 serving as the press surface of the punch 63 stands flat. As materials used to form the hollow member 54, it is preferable to use a cylindrical pipe 65 made of a relatively soft metal as exemplified by brass. This pipe 65 may preferably have an outer diameter of from 0.5 to 5 mm, an inner diameter of from 0.1 to 4.9 mm and a length of from 1 to 20 mm. The pipe 65 may also preferably be beforehand beveled so as to be tapered at the peripheries of its both end faces.

The hollow member can be produced in the manner as described below. First, as shown in FIG. 11(A), the pipe 65 is put on the groove 62 of the die 61. In that state, as shown in FIG. 11(B), the punch 63 is descended to press the pipe 65. Then, as shown in FIG. 11(C), the pipe 65 is pressed until the punch 63 come into contact with the die 61, whereupon it is crushed into a cross sectionally half-round shape in the groove 62 of the die 61 to form the hollow member 54. The hollow member 54 thus obtained has in its inside a hollow path 54a having a half-round cross section, and, as a surprising effect, a holding groove 54b extending in the axial direction is formed at the center (widthwise) of its planar portion 54c.

A linear projection (not shown) may be provided at the center of the bottom surface of the punch 63 so that the holding groove 54 can be surely formed.

As described above, according to the optical fiber holder of the present invention, the pair of substantially half-round cylindrical hollow members are face-to-face put together with their planar portions inside, and the optical fiber is inserted between these planar portions so that the periphery of the hollow members are pressed against the inner wall of the holding case, whereby the optical fiber is elastically tightened and fixed. Hence the optical fiber can be hardly damaged and also can be firmly fixed because of the great contact areas assured in the axial direction and in the peripheral direction.

Also, since the elasticity produced when the hollow members are pressed against the wall is utilized to fix the optical fiber, the force of pressing and the precision of working may not need to be so strictly controlled, bringing about an improvement in productivity.

Moreover, when the optical fiber holding groove is formed at the center of the planar portion of each hollow member, the optical fiber can be more surely fixed.

Furthermore, in the case when one-end of the holding groove of the hollow member is made to have a larger inner groove diameter to form the optical fiber lead-in portion and the other-end thereof is made to have a smaller inner groove diameter to form the optical fiber fixing portion, the optical fiber can be easily and surely inserted to the holding grooves of the hollow members when the optical fiber is inserted in the state that the hollow members are fitted to the holding case.

What is claimed is:

1. An optical fiber holder comprising:
    a pair of hollow metal members opposingly provided so as to interpose an optical fiber between them, and
    a holding case that holds the hollow metal members in such a state that their peripheries are pressed against an inner chamber wall of said bolder;
    each of said hollow metal members being in the shape of a half-round cylinder for its periphery, each of said hollow metal members having a hollow longitudinal chamber internal to said hollow metal member, and being provided in such a manner that the planar portions thereof face each other so that the optical fiber is held between said hollow metal members at the center of each planar portion thereof.

2. The optical fiber holder according to claim 1, wherein a holding groove to which the optical fiber is to be fitted in the axial direction is formed at the center of each planar portion of said hollow metal members.

3. The optical fiber holder according to claim 2, wherein one-end of said holding groove is made to have a larger inner groove diameter to form a fiber lead-in portion and the other-end of said holding groove is made to have a smaller inner groove diameter to form a fiber fixing portion.

4. The optical fiber holder according to claim 3, wherein said hollow metal members are each provided with a terrace at the middle of each planar portion thereof, and the planar portion around the optical fiber fixing portion of said holding groove has a plane receded toward the peripheral side of the hollow metal member with respect to the planar portion around the optical fiber lead-in portion of said holding groove.

5. The optical fiber holder according to claim 1, wherein said holding case comprises:
    an optical fiber guide formed of a cylindrical member having at the center thereof an insertion hole through which the optical fiber is fittingly inserted, said cylindrical member having such a shape that the outer diameter of its rear-end is smaller than the outer diameter of its front-end; and a sleeve, one end of which has such an inner diameter that said pair of hollow metal members can be inserted therein and the rear end of said optical fiber guide is press-inserted into said one end of said sleeve to retain said pair of hollow members within said sleeve, and the other end of said sleeve having an inner diameter such that the periphery of said pair of hollow metal members can be pressed against an inner chamber wall of said sleeve when the hollow metal members are crammed thereinto with the rear end portion of said optical fiber guide.

6. The optical fiber holder according to claim 5, wherein said hollow longitudinal chamber of each of said hollow metal members having a lateral cross-sectional shape of a crescent.

7. The optical fiber holder according to claim 1, wherein said hollow longitudinal chamber of each of said hollow metal members having a lateral cross-sectional shape of a crescent.

* * * * *

UNITED STATES PATENT AND TRADEMARK OFFICE
CERTIFICATE OF CORRECTION

PATENT NO. : 5,644,672
DATED : July 1, 1997
INVENTOR(S) : Toshiyasu TANAKA

It is certified that error appears in the above-indentified patent and that said Letters Patent is hereby corrected as shown below:

TITLE PAGE:

Please change the name of the Assignee under the [73] Assignee heading from "Asahi Kohoen, Co., Ltd." to
--Asahi Kohden, Co., Ltd.--

Signed and Sealed this

Twenty-eighth Day of October, 1997

Attest:

BRUCE LEHMAN

*Attesting Officer*      *Commissioner of Patents and Trademarks*